United States Patent [19]

Sasaki

[11] Patent Number: 4,460,398
[45] Date of Patent: Jul. 17, 1984

[54] FREEZE VALVE HAVING MULTIPLE HEATING-COOLING MEANS

[75] Inventor: Noriaki Sasaki, Naka, Japan

[73] Assignee: Doryokuro Kakunenryo Kaihatsu Jigyodan, Tokyo, Japan

[21] Appl. No.: 494,494

[22] Filed: May 17, 1983

Related U.S. Application Data

[63] Continuation of Ser. No. 266,062, May 19, 1981, abandoned.

[30] Foreign Application Priority Data

Aug. 5, 1980 [JP] Japan ................................ 55-107325

[51] Int. Cl.³ ............................................. C03B 5/26
[52] U.S. Cl. ...................................... 65/327; 65/326; 65/334; 65/128; 137/13
[58] Field of Search ................. 65/327, 128, 162, 164, 65/325, 326, 334, 133; 165/65; 137/13; 222/592, 593, 544

[56] References Cited

U.S. PATENT DOCUMENTS

| | | | |
|---|---|---|---|
| 1,840,458 | 1/1932 | Lott | 65/128 X |
| 1,956,171 | 4/1934 | Hitner | 65/327 X |
| 2,186,718 | 1/1940 | Ferguson | 65/128 |
| 2,250,110 | 7/1941 | Kucera | 65/327 |
| 2,978,750 | 4/1961 | McMullen | 65/327 |
| 3,271,126 | 9/1966 | Jenkins | 65/128 |
| 3,580,976 | 5/1971 | Bussy | 65/162 X |
| 4,402,724 | 9/1983 | Weisenburger et al. | 65/128 |

*Primary Examiner*—Kenneth M. Schor
*Attorney, Agent, or Firm*—Wenderoth, Lind & Ponack

[57] ABSTRACT

A freeze valve for a molten glass discharging nozzle is disposed at the bottom of a glass melting furnace. The freeze valve has at least two sets of temperature control units provided around the nozzle and arranged in series in the longitudinal direction of the nozzle, and an ejector for ejecting a high-pressure gas disposed at the lower end of the nozzle and adapted to eject the high-pressure gas toward the axis of the nozzle. Each of the temperature control units includes heating and cooling means so as to heat and cool independently both the upper and lower portions of the nozzle.

4 Claims, 3 Drawing Figures

FREEZE VALVE HAVING MULTIPLE HEATING-COOLING MEANS

This application is a continuation, of now abandoned application Ser. No. 266,062, filed May 19, 1981.

BACKGROUND OF THE INVENTION

The present invention relates to a freeze valve for a molten matter discharging nozzle disposed at the bottom of a melting furnace. Such a freeze valve is closed by solidification of the molten matter itself in the discharging nozzle, and is effectively employed, in particular, although not exclusively, when radioactive waste is vitrified or solidified in glass, synthetic rocks and stones, and the like by using a melting furnace.

As one of the methods for solidifying radioactive waste, there has been employed a method for vitrifying the waste. In this method, the radioactive waste is mixed with flux, and the mixture is heated and made molten in a glass melting furnace, and the resulting molten glass material is discharged from the furnace and cooled so as to be solidified. In order to control the discharge of the molten glass material from the furnace into a molten glass material receiving vessel disposed below the furnace, it is required to provide a molten glass material discharging nozzle provided with means for causing the molten glass material to flow and stopping the molten glass material flow. Such a means is known as a so-called freeze valve.

A conventional freeze valve comprises a heating and cooling unit for heating or cooling the molten glass material discharging nozzle disposed at a bottom portion of the melting furnace to thereby permit the molten glass material to flow or stop it from flowing. Namely, the glass material solidified in the nozzle is made molten by heating the nozzle to permit the molten glass material to flow, and by cooling the nozzle, the molten glass material is solidified within the nozzle to plug the nozzle and stop the flow of the molten glass material. The term "freeze valve" indicates the function as described above.

Since the radioactivity around a glass melting furnace for use in immobilizing the radioactive waste in glass is quite high, such a melting furnace should be installed in a chamber provided with a safety shield to block radiation, such as a concrete shield, and the operation and maintenance of the melting furnace should be remote-controlled. Accordingly, it is necessary that the freeze valve to be attached to the glass melting furnace be constructed simply, be capable of being operated easily and be free of trouble and have a long life. Since the substance being handled is glass material having a high temperature (1000°-1200° C. in an ordinary case, and about 1350° C. in an extreme case) and high radioactivity, it is necessary that the freeze valve for controlling the flow of the substance be operated accurately and reliably.

However, when the flowing of molten glass material is stopped by using such a conventional freeze valve as described above, the viscosity of the glass rapidly increases as the discharging nozzle is cooled, and the glass material is solidified into a thin, long thread extending from the lower end of the nozzle to a molten glass material receiving vessel positioned below the nozzle. Under such circumstances, the thread will break due to the residual strain. This results in the scattering of broken pieces of the thread and the spread of radioactive contamination. Also, when the molten glass material receiving vessel is removed from beneath the melting furnace in order to put a cover on the vessel, the thin thread extending from the vessel will be bent and broken and will scatter. Such thread may also damage the cover when the cover is welded to the vessel to seal the glass material therein. Therefore, it is necessary to prevent the long thread from being formed when the stringing molten glass material is solidified, but no special steps have been taken to solve this problem.

When the long thread formed in the above-mentioned manner is bent and breaks, a large amount of solidified glass material is necessarily left on the lower end portion of the nozzle. Consequently, when the nozzle is heated to restart the flowing of molten glass material, the solidified glass material left on the lower end portion of the nozzle interferes with the flow of the molten glass material, so that the molten glass material is prevented from flowing exactly in a perpendicular direction. As a result, the molten glass material falls beside the receiving vessel, which is disposed in alignment with the nozzle, or adheres to the inner surface of a protective hood disposed between the nozzle and receiving vessel.

Therefore, it is strongly desired to develop a freeze valve which is free from the above-described problems and which permits reliably carrying out the flow and stopping of the molten glass material.

SUMMARY OF THE INVENTION

An object of the present invention is to provide a freeze valve having a simple construction, capable of being easily remote-controlled, and free from trouble.

Further object of the present invention is to provide a freeze valve capable of reliably controlling the flow and stopping of molten glass material contained in a melting furnace without forming a long thread of glass material due to solidification of the stringing molten glass material and without leaving a large amount of solidified glass material on the lower end of a molten glass material discharging nozzle.

Another object of the present invention is to provide a method for controlling the flow and stopping of molten glass material contained in a melting furnace by using the freeze valve as described above.

According to the present invention, there is provided a freeze valve for a molten glass material discharging nozzle disposed at the bottom of a glass melting furnace, which freeze valve comprises: at least two sets of temperature control units each having heating and cooling means therein, said temperature control units being provided around the discharging nozzle in series with each other in the longitudinal direction of the nozzle; a heat insulating element inserted between said temperature control units and adapted to thermally insulate said temperature control units from each other to thereby permit them to heat and cool independently each the upper and lower portions of said nozzle; and means for ejecting a high-pressure gas disposed at the lower end of said nozzle and adapted to eject the high-pressure gas toward the axis of said nozzle.

The heating and cooling means preferably comprises a high frequency coil consisting of a hollow pipe wound around the discharging nozzle, means for applying a high frequency to the coil to cause induction heating of the nozzle, and means for introducing cooling water into the hollow pipe thereby cooling the nozzle.

According to the present invention, there is also provided a method for controlling the flow of molten glass material and stopping the flowing of the same from a molten glass material discharging nozzle disposed at the bottom of a glass melting furnace, which method comprises: providing at least two sets of temperature control units around said nozzle arranged in series with each other in the longitudinal direction of said nozzle and adapted to heat and cool independently the upper and lower portions of said nozzle; for causing flow of the molten glass material from said nozzle, heating both the upper and lower portions of said nozzle to sufficiently melt the glass material in the nozzle; for stopping the flowing of the molten glass material from said nozzle, cooling the upper portion of said nozzle to solidify the molten glass in the upper portion of said nozzle, while heating the lower portion of said nozzle so as to cause the molten glass material in the lower portion of said nozzle to flow; and then cooling the lower portion of the nozzle and ejecting a high-pressure gas at the lower end of said nozzle toward the axis of said nozzle.

The preferred embodiments of the present invention will be hereinafter described in detail with reference to the accompanying drawings.

PREFERRED EMBODIMENTS OF THE INVENTION

Figure 1:
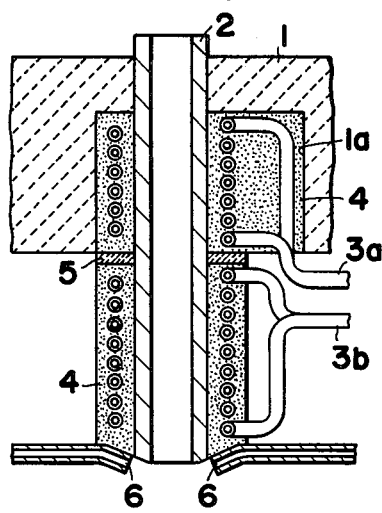
FIG. 1 is a sectional view of one embodiment of a freeze valve according to the present invention.

Referring to FIG. 1 showing an embodiment of the present invention, a motlen glass material discharging nozzle 2 made of a heat and glass resistant metallic material is disposed in the bottom wall of a glass melting furnace 1. There is provided a recess 1a in the lower portion of the furnace bottom wall 1 in the vicinity of the nozzle 2. In the recess portion 1a, a first or upper high frequency coil 3a is placed around the upper portion of the nozzle 2 and fixed firmly in position by a coil fixing material 4. A second or lower high frequency coil 3b is also provided around the lower portion of the nozzle 2 and is fixed firmly in position by the coil fixing material 4. Each of the first and second high frequency coils 3a and 3b consists of a coiled pipe through which cooling water can flow, so that the coils are operable as both heating and cooling means. The first and second high frequency coils 3a and 3b are thermally insulated from each other by a heat insulating element 5 between them, so that these coils 3a and 3b can be controlled independently and can be operated separately to carry out heating and cooling. At the lower end of the discharging nozzle 2 is provided a set of high-pressure gas ejection ports 6 directed toward the axis of the nozzle.

Figure 2:
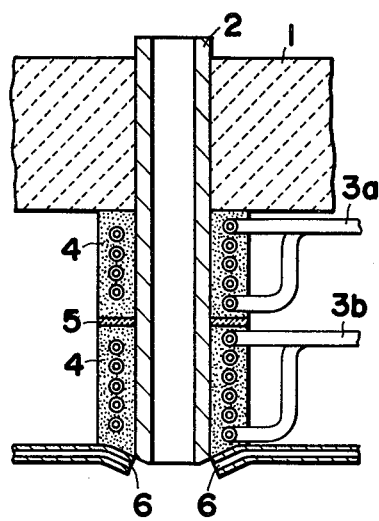
FIG. 2 is a sectional view of another embodiment of a freeze valve according to the present invention.
Figure 3:
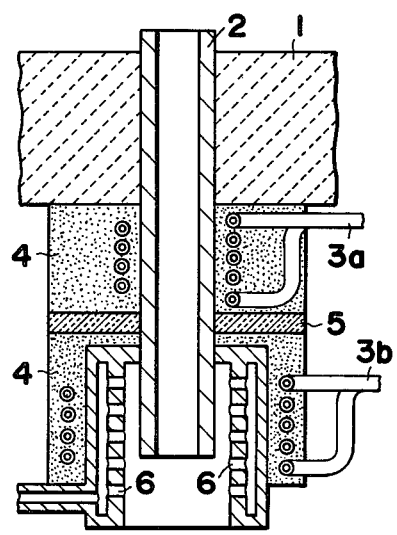
FIG. 3 is a sectional view of still another embodiment of a freeze valve according to the present invention.

FIGS. 2 and 3 illustrate two other embodiments of the present invention, in which components corresponding to those of the embodiment shown in FIG. 1 are designated by the same reference numerals. Detailed descriptions of these components shown in FIGS. 2 and 3 will therefore be omitted. In the embodiments shown in FIGS. 2 and 3, the first and second high frequency coils 3a and 3b are wound around the portion of the discharging nozzle 2 which is downwardly projected directly from the lower surface of the melting furnace 1. In the embodiment shown in FIG. 3, a plurality of high-pressure gas ejection ports 6 are provided in the vicinity of the periphery of the lower end of the discharging nozzle 2.

The operation of the freeze valve constructed as described above will be explained hereinbelow.

In order to discharge molten glass material from the glass melting furnace, high-frequency current is applied to both the first and second high-frequency coils 3a and 3b to subject the discharging nozzle 2 to induction heating to thereby cause the glass material in the nozzle 2 to be melted and to flow out. Even in such a case, it is necessary to introduce cooling water into the high-frequency coils 3a and 3b for the purpose of preventing the temperature of the coils 3a and 3b themselves from being unduly increased.

In order to stop the flow of molten glass material, the application of high-frequency current to the first or upper high frequency coil 3a is stopped while continuing to introduce the cooling water thereinto, while continuing to apply high-frequency current and cooling water to the second or lower high-frequency coil 3b to maintain only the second high-frequency coil 3b in a heated state. As a result, the molten glass material is cooled and solidified within the upper portion of the nozzle 2 to thereby stop the flow of the molten glass material out of the melting furnace. The molten glass material within the second high frequency coil 3b, on the other hand, flows out of the discharging nozzle 2.

In the final step of stopping the flow of the glass material, a high-pressure gas such as, for example, air or nitrogen gas, is ejected from the high-pressure gas ejection ports 6 provided around the lower or free end of the nozzle 2 to thereby cut the stringing glass material and, at the same time, the free end of the nozzle 2 is rapidly cooled. Needless to say, the application of high-frequency current to the second or lower high frequency coil 3b is stopped to interrupt the heating thereof during this final step.

Such an operation as described above effectively permits the flow of the molten glass material to be stopped without leaving glass in the free end portion of the nozzle 2 and without stringing of the molten glass material which is likely to form a glass material thread between the nozzle 2 and a molten glass material receiving vessel (not shown) positioned below the nozzle.

The most important consideration for constructing the freeze valve of the present invention is to determine a location for, and the configuration of the lower heating source so as to sufficiently heat the free end portion of the nozzle 2. If the free end portion of the nozzle is not sufficiently heated, the temperature thereof is not increased sufficiently to avoid formation of stringing glass material.

The second most important consideration in the present invention is to sufficiently cool the upper portion of the nozzle 2. In order to accomplish such a sufficient cooling of the upper portion of the nozzle, it is also important to heat-insulate the upper portion of the nozzle against the effect of the heating of the lower portion of the nozzle. The heat insulating element 5 as shown in the above-illustrated embodiments functions to thermally separate the upper portion of the nozzle from the lower portion thereof in an effective manner.

While the construction and operation of the freeze vlave of the invention have been explained with respect to the preferred embodiments, the present invention is not restricted to these embodiments. Although there is no limitation on the material for the nozzle and the type of the heating and cooling system, the heating system employed in the embodiments, in which a nozzle consisting of a heat and glass resistant metallic material is subjected to induction heating by high frequency current, is preferable from the standpoint of the durability, controllability and simpleness of construction. In such an induction heating system, it is necessary to supply cooling water into highfrequency coils, which cooling water can be also utilized to cool the nozzle when the nozzle heating operation is interrupted. From the view point described above, it is considered that the induction heating system is most preferably employed as a heating and cooling means in the present invention. Three or more heating and cooling means may be, of course, provided in the freeze valve according to the present invention. However, it is preferable to employ two heating and cooling means as illustrated in the embodiments, because the construction becomes more complicated by increasing the number of the heating and cooling means and because no great improvement in the operation can be expected when the number of the heating-cooling means is increased.

The freeze valve according to the present invention of the above-described construction has no mechanically or electrically movable portions, and can be formed of radiation resistant and heat resistant materials which are generally-known and widely-used. Accordingly, this freeze valve is rarely worn out, fatigued, radiation-damaged or thermally damaged, so that the freeze valve almost never fails, deteriorates, or undergoes a reduction of the efficiency of its performance. In fact, the freeze valve according to the present invention can be used stably for a long period of time. Moreover, this freeze valve functions by very simple operations, i.e. only the heating and cooling of nozzle and the ejecting of a high-pressure gas, so that it can be remote-controlled easily. Since this freeze valve also has a simple construction, the dimensions thereof can be reduced to a great extent.

When the freeze valve according to the present invention is used, the molten glass material starts flowing from the discharging nozzle only a short period of time after the start of operation since the nozzle is heated by using a plurality of heating means. In order to stop flowing of the glass material, the upper portion of the nozzle is cooled to solidify the glass material therein while the lower portion of the nozzle is continued to be heated sufficiently. Thus, a large amount of glass material does not remain in a lower end portion of the nozzle. In addition, a high-pressure gas is ejected at the lower end portion of the nozzle to cut the stringing glass material and cool the lower end portion of the nozzle rapidly at once, so that the formation of a long thread of solidified glass material can be prevented.

What is claimed is:

1. A molten glass material discharge nozzle structure for the bottom of a glass material melting furnace, said structure having a freeze valve incorporated therein, said structure comprising:
   a glass material discharge nozzle made of a heat and glass resistant material;
   at least two heating and cooling means for (1) selectively heating molten glass material discharging through said discharge nozzle or (2) selectively conveying a cooling medium in heat exchange relationship with the discharge nozzle, said conveying being for positively cooling the glass material discharging through said discharge nozzle, said heating and cooling means being provided around respective upper and lower parts of the length of said discharge nozzle and in series in the longitudinal direction of said discharge nozzle to form the freeze valve;
   a heat insulating element located between the respective heating and cooling means and extending radially outwardly from said discharge nozzle to a point radially outwardly beyond said heating and cooling means and thermally insulating the individual heating and cooling means from each other whereby the heat and cooling produced by the heating and cooling means surrounding the upper part of said discharge nozzle is independent of the heating and cooling produced by the heating and cooling means surrounding the lower part of said discharge nozzle; and
   ejection means disposed at the lower end of said discharge nozzle, the ejection means being for ejecting a high pressure gas toward the axis of said discharge nozzle with sufficient force to cut a molten glass material stream issuing from the lower end of said discharge nozzle to cool the lower end of said discharge nozzle;
   the structure being designed such that the upper and lower parts of the length of said discharge nozzle surrounded by said heating and cooling means can be heated and cooled independently of each other, and molten glass material can be discharged through said nozzle structure by operating the heating and cooling means around both the upper and lower parts of said nozzle to heat both the upper and lower parts of the length of the discharge nozzle sufficiently to melt the glass material therein, and the flow of molten glass material through said discharge nozzle can be stopped by operating the heating and cooling means around the upper part of said discharge nozzle to cool the upper part of the discharge nozzle to thereby solidify the molten glass material in said upper part while operating the heating and cooling means around the lower part of said discharge nozzle to heat the lower part of the discharge nozzle to thereby cause molten glass material in said lower part to continue to flow.

2. The nozzle structure as claimed in claim 1, wherein said heating and cooling means each comprises a high frequency coil consisting of a hollow pipe wound around said nozzle, means for applying a high frequency current to said hollow pipe, and means for introducing cooling water into said hollow pipe.

3. The nozzle structure as claimed in claim 1, wherein said high-pressure gas ejecting means comprises a plurality of ejection ports disposed around the vicinity of said lower end of said nozzle.

4. The nozzle structure as claimed in claim 1, wherein said discharging nozzle is made of metallic material, and wherein each of said heating and cooling means comprises a high frequency coil consisting of a hollow pipe wound around said discharge nozzle, means for applying a high frequency current to said coil to produce induction heating of said discharge nozzle, and means for introducing cooling water into said hollow pipe for cooling said discharge nozzle.

* * * * *